United States Patent
Kinlen et al.

(10) Patent No.: US 10,167,394 B2
(45) Date of Patent: Jan. 1, 2019

(54) CORROSION-INHIBITING SOL-GEL COATING SYSTEMS AND METHODS

(71) Applicant: The Boeing Company, Huntington Beach, CA (US)

(72) Inventors: Patrick John Kinlen, Fenton, MO (US); Lawrence Michael Lawless, Chesterfield, MO (US); Eileen Olga Kutscha, Seattle, WA (US)

(73) Assignee: The Boeing Company, Chicago, IL (US)

( * ) Notice: Subject to any disclaimer, the term of this patent is extended or adjusted under 35 U.S.C. 154(b) by 441 days.

(21) Appl. No.: 14/554,335

(22) Filed: Nov. 26, 2014

(65) Prior Publication Data

US 2016/0145443 A1    May 26, 2016

(51) Int. Cl.
| | |
|---|---|
| *C23C 28/00* | (2006.01) |
| *C09D 5/08* | (2006.01) |
| *C09D 165/00* | (2006.01) |
| *C23C 26/00* | (2006.01) |
| *C08K 5/56* | (2006.01) |

(Continued)

(52) U.S. Cl.
CPC .............. *C09D 5/08* (2013.01); *C08K 5/56* (2013.01); *C09D 5/086* (2013.01); *C09D 7/63* (2018.01); *C09D 165/00* (2013.01); *C23C 18/1241* (2013.01); *C23C 18/1254* (2013.01); *C23C 26/00* (2013.01); *C23C 28/00* (2013.01)

(58) Field of Classification Search
None
See application file for complete search history.

(56) References Cited

U.S. PATENT DOCUMENTS

| | | |
|---|---|---|
| 4,107,059 A | 8/1978 | King et al. |
| 4,599,425 A | 7/1986 | Hugo et al. |
| 5,143,634 A * | 9/1992 | Quinga .............. C10M 167/00 508/280 |
| 5,247,061 A | 9/1993 | Zisman et al. |
| 5,789,085 A | 8/1998 | Blohowiak et al. |

(Continued)

FOREIGN PATENT DOCUMENTS

| | | |
|---|---|---|
| WO | WO 2008/140648 | 11/2008 |
| WO | WO 2014/151533 | 9/2014 |

OTHER PUBLICATIONS

European Patent Office, Extended European Search Report for related European Patent Application No. 15193408, dated May 12, 2016.

(Continued)

*Primary Examiner* — Ronak C Patel
(74) *Attorney, Agent, or Firm* — DASCENZO Intellectual Property Law, P.C.

(57) ABSTRACT

Corrosion-inhibiting coating materials comprise a sol-gel and a corrosion-inhibiting compound with at least one disulfide group. The corrosion-inhibiting compound is contained within the sol-gel. Coated and/or laminated structures may include the corrosion-inhibiting coating materials on a metal substrate, and may include a secondary layer (e.g., a paint, etc.) adhered to the coating material opposite the metal substrate. Methods of forming a corrosion-inhibiting sol-gel comprise mixing organo-metallic compounds and the corrosion-inhibiting compound into a sol solution and incubating (e.g., reacting) the sol solution to form the corrosion-inhibiting sol-gel with the corrosion-inhibiting compound contained within the sol-gel. Generally, corrosion-inhibiting coating materials are hexavalent chromium free.

17 Claims, 1 Drawing Sheet

(51) Int. Cl.
*C23C 18/12* (2006.01)
*C09D 7/63* (2018.01)

(56) References Cited

U.S. PATENT DOCUMENTS

| | | | |
|---|---|---|---|
| 5,814,137 | A | 9/1998 | Blohowiak et al. |
| 5,849,110 | A | 12/1998 | Blohowiak et al. |
| 5,866,652 | A | 2/1999 | Hager et al. |
| 5,869,140 | A | 2/1999 | Blohowiak et al. |
| 5,869,141 | A | 2/1999 | Blohowiak et al. |
| 5,939,197 | A | 8/1999 | Blohowiak et al. |
| 6,077,885 | A | 6/2000 | Hager et al. |
| 6,447,717 | B1 * | 9/2002 | Fan ............ C02F 1/50 422/12 |
| 7,601,280 | B2 | 10/2009 | Kinlen |
| 7,662,241 | B2 | 2/2010 | Sinko |
| 7,935,181 | B2 | 5/2011 | Hayes et al. |
| 8,114,206 | B2 | 2/2012 | Hayes et al. |
| 2004/0035498 | A1 * | 2/2004 | Kinlen ............ C08F 2/46 148/250 |
| 2008/0317962 | A1 * | 12/2008 | Hayes ............ B05D 7/16 427/409 |
| 2009/0050182 | A1 * | 2/2009 | Heiche ............ B05D 7/16 134/41 |
| 2009/0305919 | A1 * | 12/2009 | Tipton ............ C10M 163/00 508/162 |
| 2011/0135945 | A1 * | 6/2011 | Monredon-Senani ............ C23C 18/06 428/447 |
| 2012/0025142 | A1 * | 2/2012 | Visser ............ C09D 5/084 252/389.61 |
| 2013/0071675 | A1 * | 3/2013 | Morris ............ C23C 22/60 428/457 |
| 2014/0315004 | A1 | 10/2014 | Kinlen et al. |
| 2016/0273111 | A1 | 9/2016 | Morris |

OTHER PUBLICATIONS

Chenan et al., "*2-Mercaptobenzothiazole-Loaded Hollow Mesoporous Silica-Based Hybrid Coatings for Corrosion Protection of Modified 9Cr-1Mo Ferritic Steel*," Corrosion, NACE, vol. 70, No. 5, pp. 496-511, May 2014.

Chen et al., "*An intelligent anticorrosion coating based on pH-responsive supramolecular nanocontainers*," Nanotechnology, IOP, vol. 23, No. 50, 505705, Nov. 19, 2012.

Reinartz, C., Stratmann, M., Lamberigts, M., Servais, J.P., and Williams, B., "Novel pretreatments for use with organic coatings on iron and zinc/zinc alloy coated strips," European Commission, EUR 18776 (1999).

Matsumoto, F., Ozaki, M., Inatomi, Y., Paulson, S.C., and Oyama, N., "Studies on the Adsorption Behavior of 2,5-Dimercapto-1,3,4-thiadiazole and 2-Mercapto-5-methyl-1,3,4-thiadiazole at Gold and Copper Electrode Surfaces," Langmuir (1999) 15, 857-865.

Sinko, J., "Challenges of chromate inhibitor pigments replacement in organic coatings," Progress in Organic Coatings 42 (2001) 267-382.

Kendig, M.W., "Evaluation of 'Smart' Protective Coatings and Surface Treatments for Aluminum," 4th International Symposium on Aluminum Surface Science and Technology (May 2006) Beaune, France.

Antonijevic, M.M. and Petrovic, M.B., "Copper Corrosion Inhibitors. A Review," International Journal of Electrochemical Science 3 (2008), 1-28.

Li, Y.S., Lu, W. Wang, Y., and Tran, T., "Studies of (3-mercaptopropyl)trimethoxysilane and bis(trimethoxysilyl)ethane sol-gel coating on copper and aluminum," Spectrochimica Acta Part A (2009) 73A, 922-928.

Harvey, T.G., Hardin, S.G., Hughes, A.E., Muster, T.H., White, P.A., Markley, T.A., Corrigan, P.A., Mardel, J., Garcia, S.J., Mol, J.M.C., and Glenn, A.M., "The effect of inhibitor structure on the corrosion of AA2024 and AA7075," Corrosion Science 53 (2011), 2184-2190.

Andpak, Inc., "Sur Prep AP-1 Aerosol Material Safety Data Sheet" (2012) 7 pages.

Vanderbilt Chemicals, Llc, "VANLUBE® 826 Specification" (Jan. 2013) 1 page.

3M Company, "3M™ Surface Pre-Treatment AC-131 Technical Datasheet" (Mar. 2013) 3 pages.

Peng, S., Zeng, Z., Zhao, W., Li, H., Chen, J., Han, J., Wu, X., "Novel functional hybrid silica sol-gel coating for copper protection via in situ thiol-ene click reaction," RSC Adv. (2014) 4, 15776-15781.

Zashch. Met. 1982, vol. 18, No. 4, p. 629-632.

* cited by examiner

CORROSION-INHIBITING SOL-GEL COATING SYSTEMS AND METHODS

FIELD

The present disclosure relates to corrosion-inhibiting sol-gel coating systems and methods.

BACKGROUND

Corrosion damage is a costly problem for environmentally exposed metals. Thus, people have attempted many solutions to prevent or reduce the effects of corrosion.

Chemically, metallic corrosion may be described as a coupled electrochemical reaction consisting of anodic metal oxidation and cathodic oxidant reduction. Metallic materials corrode in a variety of gaseous and/or aqueous environments, such as wet air in the atmosphere. In particular, metallic materials are susceptible to corrosion due to galvanic coupling, i.e., when two materials of different electrochemical potential (e.g., dissimilar metals) are electrically connected in the presence of an electrolyte (e.g., water with dissolved salt). Galvanic corrosion can occur on a macro scale, such as between different metallic components, or on a micro scale, such as between intermetallic phases at the surface of an alloy.

Corrosion protection may take a variety of forms, including utilizing corrosion-resistant metal alloys, isolating dissimilar metals, applying chemical conversion coatings, plating metals, and applying sealants (e.g., paint, epoxy, polyurethane). While in use, additional moisture barriers, such as viscous lubricants and/or protectants, may be added to a corrodible surface.

Conventional surface treatment for metals may use hexavalent chromium as the active corrosion-inhibiting ingredient. Though effective, environmentally preferred alternatives to hexavalent chromium are being sought. However, hexavalent chromium alternatives typically have several limitations including low corrosion suppression efficacy, poor compatibility with common coating materials, and high cost.

Sealants generally protect the underlying metal from corrosion by isolating the metal from the environment. If the integrity of the sealant coating is compromised, for example, because the coating does not adhere well to the metal or because the coating is damaged (cracked, scratched, etc.), the underlying metal may be exposed to corrosive conditions. Complicating the threat of corrosion due to loss of sealant integrity, sealants typically are opaque and mask the metal surface. Hence, corrosion that begins due to loss of sealant integrity may be hidden and may progress unnoticed.

The coupling of organic sealants (such as paint, epoxy, polyurethane, etc.) to metal may be enhanced by applying an adhesion promoter (also called a primer and/or a pretreatment) to the metal surface before applying the sealant. For example, silicon-zirconium-based sol-gels (e.g., 3M™ Surface Pre-Treatment AC-131) are commonly used to promote sealant adhesion without resorting to chromate conversion coatings, but with a lack of corrosion inhibition.

Thus, there exists a need for improved, and/or more environmentally preferred corrosion-inhibiting coating systems and methods that also may enhance sealant performance.

SUMMARY

Corrosion-inhibiting coating materials comprise a sol-gel and a corrosion-inhibiting compound with at least one disulfide group. The corrosion-inhibiting compound is contained within the sol-gel. Generally, corrosion-inhibiting coating materials are hexavalent chromium free. The sol-gel may be a zirconium-based sol-gel and may include the corrosion-inhibiting compound dissolved, suspended, emulsified, and/or dispersed within the sol-gel.

Coated and/or laminated structures may include the corrosion-inhibiting coating materials on a metal substrate, and may include a secondary layer (e.g., a paint, etc.) adhered to the coating material opposite the metal substrate.

Methods of forming a corrosion-inhibiting sol-gel comprise mixing organo-metallic compounds and the corrosion-inhibiting compound into a sol solution and incubating (e.g., reacting) the sol solution to form the corrosion-inhibiting sol-gel with the corrosion-inhibiting compound contained within the sol-gel. The corrosion-inhibiting coating materials may be coated onto a metal substrate and/or cured on the metal substrate. A secondary layer of organic material may be applied over the coated metal substrate.

DESCRIPTION

Figure 1:
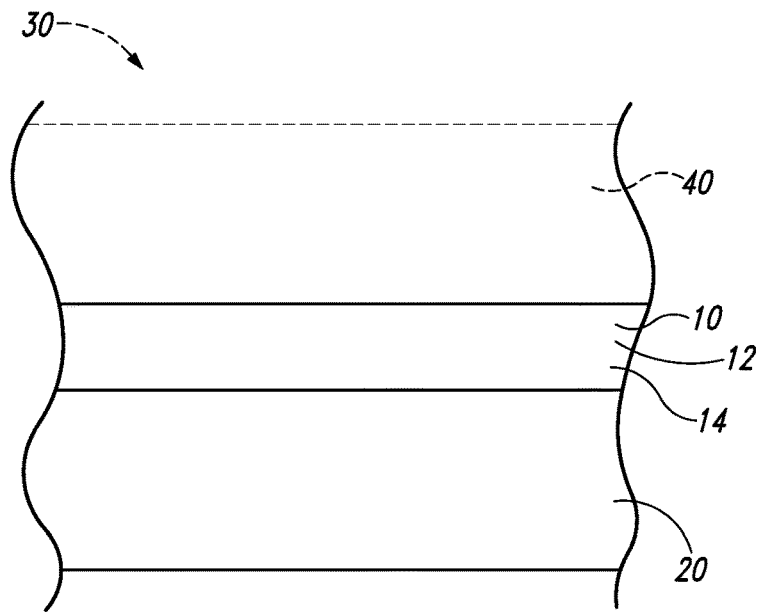
FIG. 1 is a schematic representation of a corrosion-inhibiting sol-gel coating system of the present disclosure.

Corrosion-inhibiting sol-gel coating systems and methods are disclosed herein. In general, in the drawings, elements that are likely to be included in a given embodiment are illustrated in solid lines, while elements that are optional or alternatives are illustrated in dashed lines. However, elements that are illustrated in solid lines are not essential to all embodiments of the present disclosure, and an element shown in solid lines may be omitted from a particular embodiment without departing from the scope of the present disclosure. Elements, components, and/or features that are discussed with reference to one of the figures may be included in and/or used with both of the figures without departing from the scope of the present disclosure.

FIG. 1 is a schematic representation of a corrosion-inhibiting sol-gel coating system of the present disclosure. Ordinary sol-gels, such as the commercial product 3M Surface Pre-Treatment AC-131 (silicon-zirconium-based), are systems that are employed on metal surfaces as adhesion promoters for sealants, such as paint, epoxy, polyurethane, etc. Typically, sol-gels provide little to no corrosion protection for metals. Where corrosion protection has been desired, sol-gels have been used in conjunction with conventional corrosion protection mechanisms such as plated metal substrates. In contrast, the corrosion-inhibiting sol-gel coating system of the present disclosure comprises a coating material 10 that includes a corrosion-inhibiting compound 12 within a sol-gel 14. Because of the incorporation of the corrosion-inhibiting compound 12, coating materials 10 may be utilized to protect a metal substrate 20 from corrosion and/or to reduce the effects and/or extent of corrosion on the metal substrate 20. Hence, coating materials 10 may be referred to as corrosion-inhibiting coating materials and, because coating materials 10 incorporate sol-gels 14, may be referred to as corrosion-inhibiting sol-gels. Though not required because of the corrosion-inhibiting activity of the coating materials 10, coating materials 10 may be utilized with conventional corrosion-protection mechanisms to augment and/or to enhance the corrosion protection afforded by the coating materials 10.

Corrosion-inhibiting compounds 12 are organic compounds that include a disulfide group and/or a thiolate group, i.e., corrosion-inhibiting compounds 12 may be a compound including at least one disulfide bond and/or at least one metal-sulfide bond. Corrosion-inhibiting compounds 12 may include at least one polysulfide group and may include at least one thiol group (e.g., two or more thiol groups). The general formula of corrosion-inhibiting compounds 12 is $R^1$—$S_n$—X—$R^2$, where $R^1$ is an organic group, n is an integer greater than or equal to 1, X is a sulfur or a metal atom, and optional group $R^2$ is an organic group. Each of $R^1$ and $R^2$ may or may not include other polysulfide groups and/or thiol groups. Further, corrosion-inhibiting compounds 12 may be polymeric with a monomeric unit of the general formula $R^1$—$S_n$—X—$R^2$, where $R^1$ is an organic group, n is an integer greater than or equal to 1, X is a sulfur or a metal atom, and optional group $R^2$ is an organic group. As specific examples of $R^1$ and $R^2$ applicable to both the polymeric and the general examples of corrosion-inhibiting compounds 12, $R^1$ and $R^2$ each independently may include H, an alkyl group, a cyclic alkyl group, an aryl group, a thiol group, a polysulfide group, and/or a thione group, each of which may be substituted with 1-10 non-hydrogen atoms selected from C, N, P, O, S, Se, and Te. Generally, each of $R^1$ and $R^2$ has 1-24 carbon atoms and/or non-hydrogen atoms, and may have 1-6 carbon atoms and/or non-hydrogen atoms. For example, suitable heterocyclic examples of $R^1$ and $R^2$ groups include an azole, a triazole, a thiazole, a dithiazole, and/or a thiadiazole. As further examples, corrosion-inhibiting compounds 12 may be a polymer of 2,5-dimercapto-1,3,4-thiadiazole and/or 5,5-dithiobis-(1,3,4-thiadiazole-2(3H)-thione).

Corrosion-inhibiting compounds 12 may include a metal in a metal-thiolate complex. The corrosion-inhibiting compounds 12 may include a metal center and one or more thiol groups (ligands) bonded and/or coordinated with the metal center with a metal-sulfide bond. A thiolate is a derivative of a thiol in which a metal atom replaces the hydrogen bonded to sulfur. Thiolates have the general formula M-S—$R^1$, where M is a metal and $R^1$ is an organic group as described. $R^1$ may include a disulfide group or a polysulfide group. Metal-thiolate complexes have the general formula M-(S—$R^1$)$_n$, where n generally is an integer from 2 to 9 and M is a metal atom with affinity for sulfur. Examples of suitable metals include copper, zinc, zirconium, aluminum, iron, cadmium, lead, mercury, silver, platinum, palladium, gold, and/or cobalt.

Corrosion-inhibiting compounds 12 generally are poorly soluble (if at all) in water and aqueous solvents. Corrosion-inhibiting compounds 12 may be insoluble powders, insoluble materials (e.g., aggregates, solids, and/or liquids), hydrophobic compounds, heavy oils, and/or greases. Hence, corrosion-inhibiting compounds 12 may be dissolved in compatible solutions and/or solvents, and may be suspended, emulsified, and/or dispersed within incompatible solutions and/or solvents. Suitable solutions and/or solvents for dissolving, suspending, emulsifying, and/or dispersing corrosion-inhibiting compounds 12 may be aqueous, polar organic, and/or non-polar organic. Generally, solutions and/or solvents for dissolving, suspending, emulsifying, and/or dispersing organic compounds, sulfide compounds, and/or sol-gel components may be suitable for dissolving, suspending, emulsifying, and/or dispersing corrosion-inhibiting compounds 12. For sol-gels 14 that are aqueous and/or include an aqueous component, polar organic solvents may be advantageous for dissolving corrosion-inhibiting compounds 12, which are poorly soluble in water, before combination with the sol-gel 14 or components thereof. Additionally or alternatively, corrosion-inhibiting compounds 12 may be suspended, emulsified, and/or dispersed in an aqueous solution prior to combination with sol-gel components, e.g. sol-gel components that are aqueous and/or include an aqueous component. Examples of solutions and/or solvents for dissolving, suspending, emulsifying, and/or dispersing corrosion-inhibiting compounds 12 may include, and/or may be, at least one of water, ether (e.g., dimethyl ether), glycol ether, THF (tetrahydrofuran, a cyclic ether), NMP (N-methyl-2-pyrrolidone), and DMSO (dimethyl sulfoxide).

Sol-gel coating of metals may facilitate strong adherence (e.g., a strong bond) between the metal substrate 20 and a secondary layer 40 (e.g., an organic material such as sealant) while minimizing the environmental impacts otherwise caused by the traditional use of hexavalent chromium (or other hazardous components).

Sol-gels 14 are a solution-gelation condensation of one or more metal species (e.g., an organo-metallic species such as a metal alkoxide) in solution. The metal species are hydrolyzed and condensed to form metal-oxide cross linkages and a gel network. Where the metal species include organic groups, the gel network is a hybrid organic/inorganic polymer. The metal moieties of the metal species may interact with, react with, adhere to, and/or bond to the metal substrate 20 and/or a metal oxide layer on the metal substrate 20.

The solution of the metal species before the reaction to form the sol-gel is called the sol solution and/or the sol. The sol solution is typically a colloidal solution of small particles including the metal species. The sol-gel reaction is generally slow and, therefore, sol solutions may include hydrolysis catalysts to accelerate hydrolysis of the metal species and/or to stabilize the hydrolysis rate. Typical catalysts include acids and bases.

Sol-gels 14 may be zirconium-based, silicon-zirconium-based, and/or silicon-based sol-gels. Generally, sol-gels 14 include zirconium and may have an organo-zirconate network, a mixed-metal oxide network, a mixed-metal organo-zirconate network, and/or a zirconate-organosilicate network. Zirconium can produce high strength oxide bonds which may chemically bond the sol-gel 14 to a metal substrate and/or which may form an integral part of the gel network. Other metals with similar chemical activity to zirconium and/or silicon may be partially or completely substituted for the zirconium and/or the silicon. Suitable substitute metals include titanium, yttrium, cerium, and lanthanum. These metals produce high strength oxide bonds like those produced by zirconium.

The metal species in sol solutions that are configured to form sol-gels 14 may include organo-zirconate, and/or other organo-metallic compounds, and may include metal compounds. For example, suitable compounds include organo-zirconium, organo-zirconate, zirconium alkoxide, zirconium oxide, organo-silicon, silicon alkoxide, organo-titanium, titanium alkoxide, yttrium oxide, yttrium alkoxide, organo-cerium, cerium oxide, cerium alkoxide, organo-lanthanum, lanthanum oxide, and lanthanum alkoxide. The organo-zirconium and/or organo-metallic compounds include organic groups such as aliphatic, alicyclic, and/or aromatic groups, with each organic group independently including 1-24 carbon atoms and/or non-hydrogen atoms. Each organic group optionally may be a 'lower' organic group that includes 1-6 carbon atoms and/or non-hydrogen atoms. For example, the organo-zirconate may include, and/or may be, at least one of zirconium alkoxide, zirconium tetrapropoxide, and zirconium tetra-isopropoxide. As another example, the organo-metallic compound may be an organosilane such as tetraethoxysilane, 3-glycidoxypropyltrimethoxysilane, or 3-aminopropyltriethoxy-silane. Further, the organo-zirconium and/or other organo-metallic compounds may include an organic group configured to bond to an organic material (e.g., to an epoxy, a polyurethane, and/or a polyimide). Suitable groups include an epoxide group (e.g., a glycidoxy group) to bind to epoxy and/or polyurethane materials and a primary amine to bind to polyimide materials.

The sol solution may include a sol carrier solution in which the metal species are dissolved, suspended, emulsified, and/or dispersed. The sol carrier solution may be an aqueous solution, a polar organic solution, and/or a nonpolar organic solution. For example, the sol carrier solution may include one or more of water, an alcohol, propanol, an ether, a glycol ether, dipropylene glycol dimethyl ether, and dimethyl ether. Additionally or alternatively, the sol solution may include several other components, including, for example, organic components, non-polar components, surfactants, emulsifiers, and/or pigments.

When the sol-gel 14 is formed, corrosion-inhibiting compounds 12 are contained within the sol-gel 14. Corrosion-inhibiting compounds 12 may be dissolved within the sol solution. Additionally or alternatively, because corrosion-inhibiting compounds 12 may not be significantly soluble in the sol solution, corrosion-inhibiting compounds 12 may be suspended, emulsified, and/or dispersed within the sol solution. When the corrosion-inhibiting compounds 12 are contained within the sol-gel 14, the corrosion-inhibiting compounds 12 may be retained, encapsulated, and/or trapped within the gel network of the sol-gel 14. Additionally or alternatively, the corrosion-inhibiting compounds 12 contained within the sol-gel 14 may be associated with and/or chemically bonded to the gel network of the sol-gel 14. When associated with and/or chemically bonded to the gel network, the corrosion-inhibiting compounds 12 may be an integral component of the gel network (e.g., bonded as part of the backbone of the gel network), a cross-link within the gel network, and/or a pendant group on the gel network.

As one example of a suitable sol solution for forming sol-gel 14, the sol solution may be a water solution which includes a mixture of zirconium tetrapropoxide, to bond to the metal substrate 20, and an organosilane (such as 3-glycidoxypropyltrimethoxysilane), to covalently bond to the organic material of the secondary layer 40. The sol solution further may include an acetic acid component as a catalyst and rate stabilizer of zirconium and silicon hydrolysis. The concentration of the zirconium component may be 0.2-3 wt. % (e.g., about 1 wt. %) and the concentration of the silicon component may be about twice the concentration of the zirconium component (i.e., 0.4-6 wt. %, e.g., about 2 wt. %). The concentrations of components and the ratio of concentrations may be adjusted to form suitable films (e.g., continuous films with little to no cracks and/or defects) on the metal substrate 20.

As another example of a suitable sol solution for forming sol-gel 14, the sol solution may be an alcohol-ether solution which includes zirconium tetrapropoxide. The concentration of the zirconium component may be about 1-3 wt. % (e.g., 2 wt. %) and the sol carrier solution may be 10-25% (e.g., about 20%) propanol, 25-50% (e.g., about 40%) dipropylene glycol dimethyl ether, and 35-50% (e.g., about 40%) dimethyl ether.

Generally, coating materials 10 are chromium free and/or hexavalent chromium free, i.e., they include essentially no chromium and/or hexavalent chromium. Corrosion-inhibiting compounds 12 and sol-gels 14 generally are chromium free and/or hexavalent chromium free. Coating materials 10, corrosion-inhibiting compounds 12, and/or sol-gels 14 may include trace amounts of hexavalent chromium, for example less than 10,000 ppm (parts per million), less than 1000 ppm, less than 100 ppm, less than 10 ppm, less than 1 ppm, less than 100 ppb (parts per billion), less than 10 ppb, or less than 1 ppb of hexavalent chromium by weight.

Metal substrates 20 may be formed from any suitable material and/or may include any suitable structure that may benefit from coating material 10 and/or that may be exposed to the natural environment. As examples, metal substrates 20 may define one or more components (such as structural or mechanical components) of environmentally exposed apparatuses, such as aircraft, watercraft, spacecraft, land vehicles, equipment, and/or any apparatus susceptible to environmental degradation. Metal substrates 20 may include, and/or may be, metal and/or metal alloys, such as aluminum, aluminum alloy, iron, iron alloy, steel, titanium, titanium alloy, copper, and/or copper alloy. Metal substrates 20 may be 'bare' substrates, having no plating (unplated metal), conversion coating, and/or corrosion protection between the metal substrate 20 and the coating material 10. Additionally or alternatively, metal substrates 20 may include surface oxidization. Hence, coating materials 10 may be directly bonded to metal substrates 20 and/or to surface layers of metal substrates 20.

Coating materials 10 may be configured to tenaciously bond to the metal substrate 20 and/or a secondary layer 40. Coating materials 10 coated on, adhered to, and/or bonded to the metal substrate 20 form a coated metal substrate 30. The secondary layer 40 may adhere and/or may be bonded to the coating material 10 of the coated metal substrate 30, e.g., the secondary layer 40 may contact, may adhere to, and/or may be bonded to the coating material 10 opposite the metal substrate 20. The coated metal substrate 30 with or without the secondary layer 40 may be referred to as a laminated structure. The thickness of the coating materials 10 when coated on, adhered to, and/or bonded to the metal substrate 20, and when optionally adhered and/or bonded to the secondary layer 40, is relatively thin, i.e., generally thinner than the metal substrate 20. For example, the thickness of the coating materials 10 of the coated metal substrate 30 may be at least 20 nm (nanometers), at least 100 nm, at least 500 nm, at least 1 µm (microns), at least 5 µm, at least 10 µm, at most 100 µm, at most 10 µm, at most 1 µm, at most 500 nm, and/or at most 100 nm. Thinner coatings may have fewer defects (more likely to be defect free), while thicker coatings may provide more abrasion, electrical, and/or thermal protection to the underlying metal substrate 20.

Secondary layers 40 include organic material (e.g., organic chemical compositions) configured to bind and/or adhere to coating material 10. Secondary layer 40 may be, and/or may include, a paint, a topcoat, a polymeric coating (e.g., an epoxy coating, and/or a urethane coating), a polymeric material, a composite material (e.g., a filled composite and/or a fiber-reinforced composite), and/or a laminated material. Secondary layers 40 may be, and/or include, a polymer, a resin, a thermoset polymer, a thermoplastic polymer, an epoxy, a lacquer, a polyurethane, a polyester, and/or combinations thereof. Secondary layers 40 further may include a pigment, a binder, a surfactant, a diluent, a solvent, particulate (e.g., mineral fillers), fibers (e.g., carbon, aramid, and/or glass fibers), and/or other formulation additives as desired for the particular application.

Figure 2:
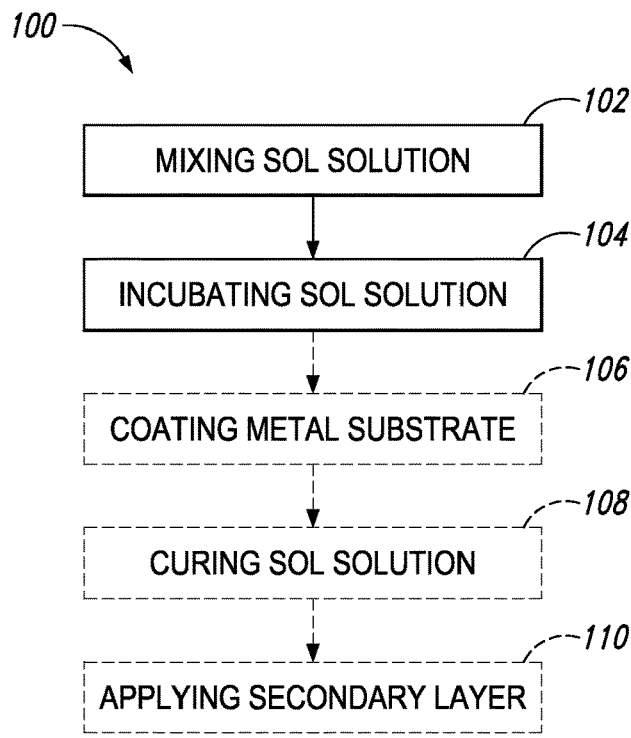
FIG. 2 is a schematic representation of methods of forming corrosion-inhibiting sol-gel coating systems of the present disclosure.

FIG. 2 is a schematic representation of methods 100 of forming coating materials 10. Coating materials 10 may be created, formed, and/or formulated by mixing 102 one or more components of the sol solution 14 (e.g., at least an organo-metallic such as an organo-zirconate) with the corrosion-inhibiting compound 12 and then incubating 104 the mixed components to form the sol-gel 14 with the corrosion-inhibiting compound 12 within the sol-gel 14.

Generally, mixing 102 is performed such that the sol solution components are combined (dispersed, emulsified, suspended, and/or dissolved) and optionally combined well enough to form a macroscopically-uniform sol solution (e.g., thoroughly dispersed, emulsified, and/or suspended, and/or fully dissolved). Accordingly, the sol solution may be referred to as a sol mixture, a sol emulsion, a sol suspension, and/or a sol colloid suspension, i.e., sol solutions are not necessarily true solutions of solute and solvent, and may include mixtures, emulsions, suspensions, and/or colloids. Further, mixing 102 generally includes mixing the sol solution components in amounts and/or ratios sufficient to provide an active sol solution—one that may react to form the sol-gel 14 that contains the corrosion-inhibiting compound 12.

Mixing 102 includes mixing the sol-gel component(s) with the corrosion-inhibiting compound 12 to form a sol solution (e.g., a solution, a mixture, an emulsion, a suspension, and/or a colloid). Hence, mixing 102 may include mixing the organo-metallic compounds, other metal compounds, and/or a sol carrier solution. Where mixing 102 includes mixing more than one component with the corrosion-inhibiting compound 12, the order of the mixing of the individual components may vary according to the desired result, for example, varied based upon the needs of the final application and/or based upon the volume, mass, associated solvent(s), and chemical reactivity of the components. For example, for reasons of convenience, chemical reactivity, and/or chemical stability, one or more of the components may be stored separately from the other components. Separate storage of at least one component may be advantageous to allow for initiation of the sol-gel reaction by combining all of the components together. The order of the mixing typically is not critical. For example, mixing 102 may include mixing all components of the sol solution together concurrently. Alternatively, mixing 102 may include mixing any two components (e.g., any two of the organo-zirconium, the other metal compounds, and the corrosion-inhibiting compound 12) to form a combined mixture and then mixing the remaining components into the combined mixture.

Mixing 102 may include dissolving, suspending, emulsifying, and/or dispersing the corrosion-inhibiting compound 12 in a solvent before mixing into one or more of the other components of the sol solution. The corrosion-inhibiting compound solvent may be an organic solvent and/or a polar solvent, for example, at least one of an ether, a glycol ether, THF, NMP, and DMSO. Additionally or alternatively, mixing 102 may include mixing the corrosion-inhibiting compound 12 as a solid, an aggregate, and/or a powder into the corrosion-inhibiting compound solvent and/or into one or more of the other components of the sol solution. Especially where mixing 102 includes mixing solids, powders, and/or viscous liquids, mixing 102 may include mixing with a high-shear mixer (e.g., a paint shaker or a planetary-centrifugal mixer). A high-shear mixer may be advantageous to break and/or to finely disperse solids to form a macroscopically-uniform sol solution. For example, a high-shear mixer may be utilized to dissolve, suspend, emulsify, disperse, homogenize, deagglomerate, and/or disintegrate solids into the sol solution.

Generally mixing 102 includes mixing to produce a dilute sol solution including the corrosion-inhibiting compound 12. The sol components generally are dilute to control self-condensation reactions and thus increase the pot life of the mixed sol solution. The corrosion-inhibiting compound 12 are mixed at a concentration similar to that of the sol solution components. Mixing 102 may include mixing such that a weight fraction of the corrosion-inhibiting compound 12 in the sol solution is at least 0.1%, at least 0.2%, at least 0.5%, at least 1%, at least 2%, at least 3%, at least 4%, at least 5%, at least 7%, at least 10%, at most 15%, at most 10%, at most 7%, at most 5%, at most 4%, at most 3%, at most 2%, at most 1%, about 1%, about 3%, and/or about 5%. Where methods 100 include forming a sol-gel with zirconium (by mixing with an organo-zirconium such as an organo-zirconate), mixing 102 may include mixing such that the weight fraction of the zirconium compound in the sol solution is at least 0.1%, at least 0.2%, at least 0.5%, at least 1%, at least 2%, at least 3%, at least 4%, at least 5%, at most 6%, at most 5%, at most 4%, at most 3%, at most 2%, at most 1%, about 3%, about 2%, and/or about 1%. Where methods 100 include forming a sol-gel with other metals (i.e., by mixing with an organo-metallic and/or other metal compounds), mixing 102 may include mixing such that a weight fraction of the other metal compounds in the sol solution is at least 0.1%, at least 0.2%, at least 0.5%, at least 1%, at least 2%, at least 3%, at least 4%, at most 5%, at most 4%, at most 3%, at most 2%, at most 1%, about 2%, about 3%, and/or about 3.4%. Examples of suitable other metal compounds and organo-metallic compounds include one or more of an organo-silicon, silicon alkoxide, organo-titanium, titanium alkoxide, organo-yttrium, yttrium oxide, yttrium alkoxide, organo-cerium, cerium oxide, cerium alkoxide, organo-lanthanum, lanthanum oxide, and lanthanum alkoxide. Additionally or alternatively, mixing 102 may include mixing such that a total weight fraction of metal compounds, such as zirconium compounds and silicon compounds, in the sol solution is at least 0.1%, at least 0.2%, at least 0.5%, at least 1%, at least 2%, at least 3%, at least 4%, at least 5%, at most 6%, at most 5%, at most 4%, at most 3%, at most 2%, at most 1%, about 4.4%, about 3.4%, about 3%, about 2%, and/or about 1%.

Mixing 102 may include mixing a small enough amount of the corrosion-inhibiting compound 12 to avoid substantially altering the properties of sol solution and/or the resulting sol-gel (relative to a sol solution and/or resulting sol-gel without the corrosion-inhibiting compound 12). In particular, mixing 102 may include mixing a small enough amount of the corrosion-inhibiting compound 12 to permit the resulting coating material 10 to adhere to the metal substrate 20 and the optional secondary layer 40. Further, mixing 102 may include mixing an amount of corrosion-inhibiting compound 12 effective to inhibit corrosion of the metal substrate 20 and/or to protect the metal substrate 20 from corrosion. The presence and extent of corrosion (and, hence, the absence or extent of inhibition/protection) may be evaluated with a neutral salt spray test (also referred to as a salt fog test) in which a test sample with a metal substrate is exposed to a spray of a standardized salt solution (such as 5 wt. % of sodium chloride dissolved in water, per ASTM B117-11, Standard Practice for Operating Salt Spray (Fog) Apparatus, ASTM International, West Conshohocken, Pa., 2011, www.astm.org).

The extent of corrosion present on a test sample after a neutral salt spray test may be evaluated according to the standards described in ASTM D1654-08, Standard Test Method for Evaluation of Painted or Coated Specimens Subjected to Corrosive Environments, ASTM International, West Conshohocken, Pa., 2008, www.astm.org. In procedure B (Evaluation of Unscribed Areas) of this ASTM method, a sample may be given a corrosion rating from 0 (greater than 50% of the exposed area corroded) to 10 (less than or equal to 0.01% of the exposed area corroded). A typical acceptable corrosion rating for unscribed test samples is 6, corresponding to a corroded area of 0.3-1.0 percent. For example, the coating material 20 may be deemed to have acceptable corrosion protection if no significant corrosion (e.g., a corrosion rating of 6 or higher) is observed after 24 hours of exposure to a neutral salt spray. The length of exposure and the types of compounds in the spray may be adjusted according to the application. Some applications may deem performance acceptable when no significant corrosion is present after 24 hours, 48 hours, 100 hours, 300 hours, 1,000 hours, or longer.

Mixing 102 may include mixing an amount of the organo-metallic compound sufficient to form a sol-gel, to contain the corrosion-inhibiting compound 12 within the resulting sol-gel, and/or to adhere and/or bond to the metal substrate 20. Further, mixing 102 may include selecting sol components, corrosion-inhibiting compounds, and/or sol carrier solutions to stabilize the corrosion-inhibiting compounds within the sol solution. The corrosion-inhibiting compounds 12 may be in the form of molecules, nanoparticles and/or microparticles with an outer shell and an inner core. The outer shell may include surface moieties which may shield sulfur groups (such as sulfide-sulfide and/or metal-sulfide associations and/or bonds) within the core from reaction with the gel network as it forms. The surface moieties may include substantially unreactive groups and/or substantially reactive groups (where reactivity is evaluated with respect to the other sol solution components). For example, surface thiol groups of corrosion-inhibiting compounds 12 may react with epoxide groups included in organo-metallic components of the sol solution and/or may form complexes with suitable metals of organo-metallic components of the sol solution. In contrast, surface thione groups of corrosion-inhibiting compounds 12 may be substantially less reactive. Additionally or alternatively, mixing 102 may include mixing stabilizing components into the sol solution. The stabilizing components may be configured to react with, associate with, and/or shield the corrosion-inhibiting compounds 12.

Mixing 102 may include mixing other components of the sol solution, such as the sol carrier solution, organic components, non-polar components, surfactants, emulsifiers, and/or pigments. The sol carrier solution may be an aqueous solution, a polar organic solution, and/or a non-polar organic solution. For example, the sol carrier solution may include one or more of water, an alcohol, propanol, an ether, a glycol ether, dipropylene glycol dimethyl ether, and dimethyl ether. Where the sol carrier solution is primarily water, the coating material 10 may be referred to as a water-based coating material 10. Where the sol carrier solution is primarily alcohol, the coating material may be referred to as an alcohol-based coating material 10.

Generally, the components of the sol solution are kept separate for transport and storage, and mixed close to the time of application (e.g., use as a coating material). When mixed (by mixing 102) and under appropriate reaction conditions (by incubating 104), the components of the sol solution react (e.g., hydrolyze and condense) to begin to form the sol-gel network (the gelation process). The initial reaction to form the initial (partial) sol-gel network may proceed relatively rapidly. The initial reaction time, also referred to as the induction time, is the time needed to partially form the sol-gel network sufficient to contain at least some of the corrosion-inhibiting compound 12 within the network. After the initial reaction time, the sol solution generally continues to react until one or more of the reaction components are exhausted, until the full sol-gel network is formed, and/or until the sol solution forms flocculants of the sol components. While the sol-gel continues to form, the mixed sol solution may be utilized to coat a metal substrate 20. The period of time from the mixing until the sol solution is unusable is referred to as the pot life of the sol solution.

Mixing 102 may be performed (by controlling the amounts and/or ratios of components) in a manner to keep the induction time relatively short and the pot life relatively long while maintaining the efficacy of the coating material 10 (e.g., the corrosion inhibition and the optional bonding and/or adherence to the metal substrate 20). For example, to affect the induction time and/or the pot life, the mixed sol solution may include compounds to catalyze and/or stabilize the hydrolyzation rate and/or the condensation rate of the organo-metallic compound. Further, where the mixed sol solution includes more than one component that forms the sol-gel network (such as two different organo-metallic components to form a mixed-metal oxide network), the mixed sol solution may include catalyzing and/or rate stabilizing components for each organo-metallic compound. Suitable induction times may be at most 60 minutes, at most 30 minutes, at most 10 minutes, at most 5 minutes, or at most 1 minute, while the pot life may be at least 1 hour, at least 2 hours, at least 4 hours, at least 8 hours, or at least 24 hours. Incubating 104 may be performed under ambient conditions, at room temperature, and/or at elevated temperature. Suitable incubation temperatures include at least 10° C., at least 20° C., at least 30° C., at least 40° C., at least 50° C., at least 70° C., at most 100° C., at most 70° C., at most 50° C., and/or at most 40° C.

Methods 100 may comprise coating 106 the metal substrate 106 with the coating material 10 formed by mixing 102 and incubating 104 (thus forming a coated metal substrate 30). Coating 106 may include wetting the metal substrate 20 with the coating material 10, for example, by spraying, immersing, brushing, and/or wiping the coating material 10 onto the metal substrate 20. For example, suitable forms of spraying may include utilizing spray guns, high-volume, low-pressure spray guns, and/or hand pump sprayers. The wetted metal substrate 20 may be allowed to drain for a few minutes (e.g., 1-30 minutes, 1-10 minutes, and/or 3-10 minutes) and, if necessary, excess, undrained solution may be blotted off the metal substrate 20 and/or gently blown off the metal substrate 20 by compressed air.

Additionally or alternatively, coating 106 may be performed concurrently with the mixing 102 and/or the incubating 104. As an example, sol solution components (such as the organo-metallic) and the corrosion-inhibiting compound 12 may be separately and/or simultaneously sprayed onto the metal substrate 20, allowing all of the components to mix during the spraying.

Coating 106 may include cleaning and/or pretreating the metal substrate 20 before wetting the metal substrate with the coating material 10. Generally, the coating material 10 will adhere and/or bond better with a clean, bare metal substrate 20, essentially free from dirt, surface oxides, and/or corrosion products. Cleaning may include degreasing, an alkaline wash, chemical etching, chemically deoxidizing, and/or mechanically deoxidizing (e.g., sanding and/or abrading). Coating 106 does not generally include coating the metal substrate 20 with an undercoating or forming a chemical conversion coating on the metal substrate 20. Instead, coating 106 generally includes directly coating the (bare) metal substrate 20.

Methods 100 may comprise curing 108 (also referred to as gelling) the coating material 10 to form a cured (sol-gel) coating material 10. Curing 108 includes the gelation reaction of the sol-gel components and may include solvent evaporation, application of heat, light, electrical potential, and/or a chemical reactant. Curing 108 may begin as soon as the sol solution components are mixed. Additionally or alternatively, curing 108 may be performed during and/or after the coating 106 (e.g., after the wetting and/or the draining). Curing 108 may form a tenacious and/or covalent bond between the coating material 10 and the metal substrate 20. The strength and/or quality of the adherence of the coating material 10 to the metal substrate 20 may be evaluated by methods such as the tape test described in ASTM D3359-09e2, Standard Test Methods for Measuring Adhesion by Tape Test, ASTM International, West Conshohocken, Pa., 2011, www.astm.org. In this test, tape is pulled off of a scribed coated sample and the adhesion is rated from 0 (substantial removal of coating) to 5 (no removal of coating). A typical acceptable adhesion rating is 4 (trace removal of coating) or 5 (no removal). The coated sample may be incubated in water, and optionally at an elevated temperature, before the tape test, in which case the test may be referred to as a wet tape test. For example, the coated sample may be immersed in boiling deionized water for two hours or immersed in 65° C. deionized water for seven days just prior to surface drying and the tape test of ASTM D3359-09e2.

Curing 108 may include drying the coating material 10 on the metal substrate 20 and may be performed under ambient conditions, at room temperature, and/or at elevated temperature. Suitable temperatures may include at least 10° C., at least 20° C., at least 30° C., at least 40° C., at least 50° C., at least 70° C., at least 100° C., at most 150° C., at most 100° C., at most 70° C., at most 50° C., at most 40° C., about 20° C., about 50° C., and/or about 120° C. Curing 108 may be performed for a period of time, such as for at least 1 minute, at least 5 minutes, at least 10 minutes, at least 30 minutes, at least 1 hour, at least 4 hours, at least 8 hours, at most 48 hours, at most 24 hours, and/or at most 8 hours.

After coating 106 and/or curing 108, the coating materials 10 and/or the coated metal substrate 30 may be suitable for external environment use and/or for application of a secondary layer 40 (e.g., by applying 110). Applying 110 a secondary layer 40 of organic material may be performed before the curing 108 is completely finished, i.e., applying 110 a secondary layer 40 may be performed at least partially concurrently with curing 108. Applying 110 may include painting, spraying, immersing, contacting, adhering, and/or bonding the coated metal substrate 30 with the organic material of the secondary layer 40. As discussed further herein, the secondary layer may include, and/or may be, a paint, a fiber-reinforced plastic, or other suitable organic materials.

Corrosion-inhibiting sol-gel coating systems and methods may be further understood with reference to the following illustrative, non-exclusive examples.

Example 1

The disulfide corrosion inhibitor 5,5-dithiobis-(1,3,4-thiadiazole-2(3H)-thione) (commercially available as Vanlube® 829 from Vanderbilt Chemicals, LLC) was dissolved in THF and then added to a sol solution of zirconium tetrapropanolate (also called zirconium tetrapropoxide) to yield mixed sol solutions with 0.1% and 1.0% concentrations of the disulfide corrosion inhibitor. The sol solution was the commercial product 3M™ Surface Pre-Treatment AC-131. 3M™ Surface Pre-Treatment AC-131 is a silicon-zirconium-based sol solution including a mixture of about 2% organosilane and about 1% zirconium alkoxide.

Four 2024-T3 aluminum alloy panels were abraded with Scotch Brite™ pads. One panel was chrome conversion coated to serve as a positive control (known corrosion resistance). One panel was spray coated with the 3M™ Surface Pre-Treatment AC-131 to serve as a negative control (known corrosion susceptibility). The other two panels were spray coated with the mixed sol solutions to form a 0.1% sample and a 1.0% sample. Panels were allowed to dry and then subjected to salt-fog exposure (neutral salt spray test). Panels were inspected after 24 hours of neutral salt fog. The positive control panel was essentially unaffected by the salt-fog exposure. The negative control panel was heavily pitted with a corrosion rating of 0 (ASTM 1654-08, procedure B). The 0.1% sample exhibited significantly less pitting than the negative control, having a corrosion rating of 3-4. The 1.0% sample exhibited even less pitting, having a corrosion rating of about 6. Separately prepared 0.1% and 1.0% samples passed a wet tape test of paint adhesion.

Example 2

The disulfide corrosion inhibitor 5,5-dithiobis-(1,3,4-thiadiazole-2(3H)-thione) (Vanlube® 829) was dissolved in THF and then added to 3M™ Surface Pre-Treatment AC-131 to give 3% and 6% concentrations of the disulfide corrosion inhibitor. At the 6% corrosion inhibitor concentration, all of the disulfide corrosion inhibitor did not dissolve, so only the 3% corrosion inhibitor concentration was further evaluated. Aluminum alloy panels were prepared and tested as with Example 1. Panels were inspected after 24 hours of neutral salt fog exposure. The 3% sample exhibited superior corrosion protection compared to the negative control, with virtually no pitting observed. The negative control had a corrosion rating of 0; the 3% sample had a corrosion rating of about 9 (ASTM 1654-08, procedure B). Separately prepared 3% samples passed a wet tape test of paint adhesion.

Examples of inventive subject matter according to the present disclosure are described in the following enumerated paragraphs.

A1. A corrosion-inhibiting coating material bonded to a metal substrate, the coating material comprising:
a corrosion-inhibiting compound that includes sulfur; and
a sol-gel bonded to the metal substrate;
wherein the corrosion-inhibiting compound is contained within the sol-gel.

A1.1. The corrosion-inhibiting coating material of paragraph A1, wherein the corrosion-inhibiting compound includes at least one disulfide group.

A1.2. The corrosion-inhibiting coating material of any of paragraphs A1-A1.1, wherein the corrosion-inhibiting compound includes at least one of a thiolate group and a metal-thiolate complex.

A1.3. The corrosion-inhibiting coating material of any of paragraphs A1-A1.2, wherein the corrosion-inhibiting compound includes a metal selected from the group consisting of zinc and zirconium.

A2. The corrosion-inhibiting coating material of any of paragraphs A1-A1.3, wherein the corrosion-inhibiting compound includes at least one polysulfide group.

A3. The corrosion-inhibiting coating material of any of paragraphs A1-A2, wherein the corrosion-inhibiting compound includes at least one thiol group.

A4. The corrosion-inhibiting coating material of any of paragraphs A1-A3, wherein the corrosion-inhibiting compound includes a thiadiazole group.

A5. The corrosion-inhibiting coating material of any of paragraphs A1-A4, wherein the corrosion-inhibiting compound is a polymer of 2,5-dimercapto-1,3,4-thiadiazole.

A6. The corrosion-inhibiting coating material of any of paragraphs A1-A5, wherein the corrosion-inhibiting compound is 5,5-dithiobis-(1,3,4-thiadiazole-2(3H)-thione).

A7. The corrosion-inhibiting coating material of any of paragraphs A1-A6, wherein the corrosion-inhibiting compound does not include hexavalent chromium.

A8. The corrosion-inhibiting coating material of any of paragraphs A1-A7, wherein the corrosion-inhibiting coating material and/or the sol-gel does not include hexavalent chromium and/or is hexavalent chromium free.

A9. The corrosion-inhibiting coating material of any of paragraphs A1-A8, wherein the corrosion-inhibiting coating material and/or the sol-gel includes less than 10,000 ppm, less than 1000 ppm, less than 100 ppm, less than 10 ppm, less than 1 ppm, less than 100 ppb, less than 10 ppb, or less than 1 ppb of hexavalent chromium by weight.

A10. The corrosion-inhibiting coating material of any of paragraphs A1-A9, wherein the corrosion-inhibiting compound is dissolved, suspended, emulsified, and/or dispersed within the sol-gel.

A11. The corrosion-inhibiting coating material of any of paragraphs A1-A10, wherein the sol-gel is a zirconium-based sol-gel.

A12. The corrosion-inhibiting coating material of any of paragraphs A1-A11, wherein the sol-gel includes an organo-zirconate network, a mixed-metal oxide network, a mixed-metal organo-zirconate network, and/or a zirconate-organosilicate network.

A13. The corrosion-inhibiting coating material of any of paragraphs A1-A12, wherein the sol-gel includes at least one of zirconium, silicon, titanium, yttrium, cerium, and lanthanum.

A14. The corrosion-inhibiting coating material of any of paragraphs A1-A13, wherein the sol-gel includes zirconium and at least one of silicon, titanium, yttrium, cerium, and lanthanum.

A15. The corrosion-inhibiting coating material of any of paragraphs A1-A14, wherein the sol-gel is directly bonded to the metal substrate.

A16. The corrosion-inhibiting coating material of any of paragraphs A1-A15, wherein the metal substrate is an unplated metal substrate.

A17. The corrosion-inhibiting coating material of any of paragraphs A1-A16, wherein the metal substrate includes, optionally is, at least one of aluminum, aluminum alloy, titanium, titanium alloy, iron, iron alloy, steel, copper, and copper alloy.

A18. The corrosion-inhibiting coating material of any of paragraphs A1-A17, wherein the metal substrate is a component of at least one of an aircraft, a watercraft, a spacecraft, a land vehicle, and equipment.

A19. A laminated structure comprising:
a metal substrate; and
the corrosion-inhibiting coating material of any of paragraphs A1-A18, bonded to the metal substrate.

A19.1. The laminated structure of paragraph A19, wherein the metal substrate is an unplated metal substrate.

A19.2. The laminated structure of any of paragraphs A19-A19.1, wherein the metal substrate includes, optionally is, at least one of aluminum, aluminum alloy, titanium, titanium alloy, iron, iron alloy, steel, copper, and copper alloy.

A19.3. The laminated structure of any of paragraphs A19-A19.2, wherein the metal substrate is a component of at least one of an aircraft, a watercraft, a spacecraft, a land vehicle, and equipment.

A19.4. The laminated structure of any of paragraphs A19-A19.3, further comprising a secondary layer of organic material bonded to the corrosion-inhibiting coating material opposite the metal substrate.

A19.4.1. The laminated structure of paragraph A19.4, wherein the secondary layer includes, optionally is, at least one of a fiber-reinforced plastic and a carbon fiber-reinforced plastic.

A19.4.2. The laminated structure of any of paragraphs A19.4-A19.4.1, wherein the secondary layer includes, optionally is, paint, epoxy, polyurethane, and polyimide.

B1. A method of forming a corrosion-inhibiting sol-gel, the method comprising:
mixing an organo-zirconate and a corrosion-inhibiting compound to form a sol solution, wherein the corrosion-inhibiting compound includes sulfur; and
incubating the sol solution to form the corrosion-inhibiting sol-gel.

B1.1. The method of paragraph B1, wherein the corrosion-inhibiting compound includes at least one disulfide group.

B1.2. The method of any of paragraphs B1-B1.1, wherein the corrosion-inhibiting compound includes at least one of a thiolate group and a metal-thiolate complex.

B1.3. The method of any of paragraphs B1-B1.2, wherein the corrosion-inhibiting compound includes a metal selected from the group consisting of zinc and zirconium.

B2. The method of any of paragraphs B1-B1.3, wherein the mixing includes mixing such that a weight fraction of the organo-zirconate in the sol solution is at least 0.1%, at least 0.2%, at least 0.5%, at least 1%, at least 2%, at least 3%, at least 4%, at least 5%, at most 6%, at most 5%, at most 4%, at most 3%, at most 2%, at most 1%, about 3%, about 2%, and/or about 1%.

B3. The method of any of paragraphs B1-B2, wherein the mixing includes mixing such that a weight fraction of the corrosion-inhibiting compound in the sol solution is at least 0.1%, at least 0.2%, at least 0.5%, at least 1%, at least 2%, at least 3%, at least 4%, at least 5%, at least 7%, at least 10%, at most 15%, at most 10%, at most 7%, at most 5%, at most 4%, at most 3%, at most 2%, at most 1%, about 1%, about 3%, and/or about 5%.

B4. The method of any of paragraphs B1-B3, wherein the mixing includes mixing a second metal compound with the organo-zirconate and the corrosion-inhibiting compound to form the sol solution.

B4.1. The method of paragraph B4, wherein the mixing includes concurrently mixing the organo-zirconate, the second metal compound, and the corrosion-inhibiting compound.

B4.2. The method of paragraph B4, wherein the mixing includes first mixing the organo-zirconate with the second metal compound to form a combined mixture and then mixing the corrosion-inhibiting compound into the combined mixture.

B4.3. The method of paragraph B4, wherein the mixing includes first mixing the organo-zirconate with the corrosion-inhibiting compound to form a combined mixture and then mixing the second metal compound into the combined mixture.

B4.4. The method of paragraph B4, wherein the mixing includes first mixing the second metal compound with the corrosion-inhibiting compound to form a combined mixture and then mixing the organo-zirconate into the combined mixture.

B4.5. The method of any of paragraphs B4-B4.4, wherein the mixing includes mixing such that a weight fraction of the second metal compound in the sol solution is at least 0.5%, at least 1%, at least 2%, at least 3%, at least 4%, at most 5%, at most 4%, at most 3%, at most 2%, about 2%, about 3%, and/or about 3.4%.

B4.6. The method of any of paragraphs B4-B4.5, wherein the second metal compound includes at least one metal selected from the group consisting of silicon, titanium, yttrium, cerium, and lanthanum.

B4.7. The method of any of paragraphs B4-B4.6, wherein the second metal compound includes at least one compound selected from the group consisting of silicon alkoxide, titanium alkoxide, yttrium oxide, yttrium alkoxide, cerium oxide, cerium alkoxide, lanthanum oxide, and lanthanum alkoxide.

B5. The method of any of paragraphs B1-B4.7, wherein the mixing includes mixing a sol carrier solution with the organo-zirconate prior to forming the sol solution.

B5.1. The method of paragraph B5, wherein the sol carrier solution includes at least one of water, an alcohol, propanol, an ether, a glycol ether, dipropylene glycol dimethyl ether, and dimethyl ether.

B6. The method of any of paragraphs B1-B5.1, wherein the mixing includes mixing an effective amount of the corrosion-inhibiting compound to protect a metal substrate, when bonded to the corrosion-inhibiting sol-gel, from significant corrosion after 24 hours of exposure to a spray of 5 wt. % of sodium chloride solution.

B7. The method of any of paragraphs B1-B6, wherein the mixing includes dissolving and/or suspending the corrosion-inhibiting compound in a solvent before mixing with the organo-zirconate and/or a/the second metal compound.

B7.1. The method of paragraph B7, wherein the solvent is a polar organic solvent.

B7.2. The method of any of paragraphs B7-B7.1, wherein the solvent includes at least one of an ether, a glycol ether, tetrahydrofuran, N-methyl-2-pyrrolidone, and dimethyl sulfoxide.

B8. The method of any of paragraphs B1-B7.2, wherein the mixing includes introducing the corrosion-inhibiting compound as a powder to the organo-zirconate.

B9. The method of any of paragraphs B1-B8, wherein the mixing includes mixing with a high-shear mixer, and optionally wherein the high-shear mixer is at least one of a paint shaker and a planetary-centrifugal mixer.

B10. The method of any of paragraphs B1-B9, wherein the corrosion-inhibiting compound includes at least one polysulfide group.

B11. The method of any of paragraphs B1-B10, wherein the corrosion-inhibiting compound includes at least one thiol group.

B12. The method of any of paragraphs B1-B11, wherein the corrosion-inhibiting compound includes a thiadiazole group.

B13. The method of any of paragraphs B1-B12, wherein the corrosion-inhibiting compound is a polymer of 2,5-dimercapto-1,3,4-thiadiazole.

B14. The method of any of paragraphs B1-B13, wherein the corrosion-inhibiting compound is 5,5-dithiobis-(1,3,4-thiadiazole-2(3H)-thione).

B15. The method of any of paragraphs B1-B14, wherein the corrosion-inhibiting compound does not include hexavalent chromium.

B16. The method of any of paragraphs B1-B15, wherein the organo-zirconate and/or the corrosion-inhibiting sol-gel does not include hexavalent chromium and/or is hexavalent chromium free.

B17. The method of any of paragraphs B1-B16, wherein the organo-zirconate and/or the corrosion-inhibiting sol-gel includes less than 10,000 ppm, less than 1000 ppm, less than 100 ppm, less than 10 ppm, less than 1 ppm, less than 100 ppb, less than 10 ppb, or less than 1 ppb of hexavalent chromium by weight.

B18. The method of any of paragraphs B1-B17, wherein the organo-zirconate includes, optionally is, at least one of zirconium alkoxide, zirconium tetrapropoxide, and zirconium tetra-isopropoxide.

B19. The method of any of paragraphs B1-B18, wherein the organo-zirconate includes an organic group configured to bond to an organic material, and optionally wherein the organic material is at least one of an epoxy, a polyurethane, and a polyimide.

B20. The method of any of paragraphs B1-B19, wherein the incubating includes incubating the sol solution to hydrolyze and/or to condense the organo-zirconate and the optional second metal compound to form at least one of an organo-zirconate network, a zirconium alkoxide network, a mixed-metal zirconate network, and a zirconate-organosilicate network.

B21. The method of any of paragraphs B1-B20, wherein the corrosion-inhibiting sol-gel is at least one of an alcohol-based corrosion-inhibiting sol-gel and a water-based corrosion-inhibiting sol-gel.

B22. The method of any of paragraphs B1-B21, further comprising coating a/the metal substrate with the corrosion-inhibiting sol-gel.

B22.1. The method of paragraph B22, wherein the coating includes wetting the metal substrate with the corrosion-inhibiting sol-gel, and optionally wherein the wetting includes at least one of spraying, immersing, brushing, and wiping the corrosion-inhibiting sol-gel onto the metal substrate.

B22.2. The method of any of paragraphs B22-B22.1, wherein the coating includes coating at least a portion of an aircraft, a watercraft, a spacecraft, a land vehicle, and equipment.

B23. The method of any of paragraphs B1-B22.2, further comprising curing the corrosion-inhibiting sol-gel on a/the metal substrate, optionally when also dependent on paragraph B22, wherein the curing is performed after the coating, and optionally when also dependent on paragraph B22.1, wherein the curing is performed after the wetting.

B23.1. The method of paragraph B23, wherein the curing includes drying the corrosion-inhibiting sol-gel on the metal substrate.

B23.2. The method of any of paragraphs B23-B23.1, wherein the curing includes curing the corrosion-inhibiting sol-gel on the metal substrate for at least 1 minute, at least 5 minutes, at least 10 minutes, at least 30 minutes, at least 1 hour, at least 4 hours, at least 8 hours, at most 48 hours, at most 24 hours, and/or at most 8 hours.

B23.3. The method of any of paragraphs B23-B23.2, wherein the curing includes curing the corrosion-inhibiting sol-gel on the metal substrate under ambient conditions and/or at room temperature.

B23.4. The method of any of paragraphs B23-B23.3, wherein the curing includes curing the corrosion-inhibiting sol-gel on the metal substrate at a temperature of at least 10° C., at least 20° C., at least 30° C., at least 40° C., at least 50° C., at least 70° C., at least 100° C., at most 150° C., at most 100° C., at most 70° C., at most 50° C., at most 40° C., about 20° C., about 50° C., and/or about 120° C.

B23.5. The method of any of paragraphs B23-B23.4, wherein the curing includes curing the corrosion-inhibiting sol-gel on at least a portion of an aircraft, a watercraft, a spacecraft, a land vehicle, and equipment.

B24. The method of any of paragraphs B22-B23.5, wherein the metal substrate is an unplated metal substrate.

B24.1. The method of paragraph B24, wherein the metal substrate includes, optionally is, at least one of aluminum, aluminum alloy, titanium, titanium alloy, iron, iron alloy, steel, copper, and copper alloy.

B24.2. The method of any of paragraphs B24-B24.1, wherein the metal substrate is a component of at least one of an aircraft, a watercraft, a spacecraft, a land vehicle, and equipment.

B24.3. The method of any of paragraphs B24-B24.2, further comprising applying a secondary layer of organic material to the corrosion-inhibiting sol-gel on the metal substrate.

B24.3.1. The method of paragraph B24.3, wherein the secondary layer includes, optionally is, at least one of a fiber-reinforced plastic and a carbon fiber-reinforced plastic.

B24.3.2. The method of any of paragraphs B24.3-B24.3.1, wherein the secondary layer includes, optionally is, paint, epoxy, polyurethane, and polyimide.

B24.3.3. The method of any of paragraphs B24.3-B24.3.2, wherein the applying is performed after the coating and/or after the curing.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function. Further, as used herein, the singular forms "a", "an" and "the" may be intended to include the plural forms as well, unless the context clearly indicates otherwise.

The various disclosed elements of systems and steps of methods disclosed herein are not required of all systems and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed system or method. Accordingly, such inventive subject matter is not required to be associated with the specific systems and methods that are expressly disclosed herein, and such inventive subject matter may find utility in systems and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

In the event that any patents or patent applications are incorporated by reference herein and (1) define a term in a manner and/or (2) are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

The invention claimed is:

1. A corrosion-inhibiting coating material bonded to a metal substrate, the coating material comprising:
    a corrosion-inhibiting compound that is insoluble in water and is a polymer of 2,5-dimercapto-1,3,4-thiadiazole, wherein the polymer of 2,5-dimercapto-1,3,4-thiadiazole includes at least one disulfide group; and
    a zirconium-based sol-gel bonded to the metal substrate, wherein the zirconium-based sol-gel is formed from an aqueous sol solution containing an emulsion of the corrosion-inhibiting compound;
    wherein the corrosion-inhibiting compound is contained within the zirconium-based sol-gel.

2. The corrosion-inhibiting coating material of claim 1, wherein the polymer includes at least one thiol group.

3. The corrosion-inhibiting coating material of claim 1, wherein the polymer includes a thiolate group.

4. The corrosion-inhibiting coating material of claim 1, wherein the corrosion-inhibiting coating material further includes 5,5-dithiobis-(1,3,4-thiadiazole-2(3H)-thione).

5. A laminated structure comprising:
    a metal substrate; and
    the corrosion-inhibiting coating material of claim 1, bonded to the metal substrate.

6. The laminated structure of claim 5, wherein the metal substrate is an unplated aluminum alloy.

7. The laminated structure of claim 5, further comprising a secondary layer of organic material bonded to the corrosion-inhibiting coating material opposite the metal substrate.

8. A method of forming a corrosion-inhibiting sol-gel, the method comprising: mixing an organo-zirconate and a corrosion-inhibiting compound that is insoluble in water to form an aqueous sol solution containing an emulsion of the corrosion-inhibiting compound, wherein the corrosion-inhibiting compound is a polymer of 2,5-dimercapto-1,3,4- thiadiazole, wherein the polymer of 2,5-dimercapto-1,3,4-thiadiazole includes at least one disulfide group; incubating the aqueous sol solution to form the corrosion-inhibiting sol-gel; and coating a metal substrate with the corrosion-inhibiting sol-gel.

9. The method of claim 8, wherein the mixing includes mixing such that a weight fraction of the organo-zirconate in the aqueous sol solution is at least 0.5% and at most 5%.

10. The method of claim 8, wherein the mixing includes mixing such that a weight fraction of the corrosion-inhibiting compound in the aqueous sol solution is at least 0.1% and at most 10%.

11. The method of claim 8, wherein the mixing includes dissolving the corrosion-inhibiting compound in a solvent before mixing with the organo-zirconate.

12. The method of claim 11, wherein the solvent includes at least one of an ether, a glycol ether, tetrahydrofuran, N-methyl-2-pyrrolidone, and dimethyl sulfoxide.

13. The method of claim 8, wherein the mixing includes introducing the corrosion-inhibiting compound as a powder to the organo-zirconate.

14. The method of claim 8, wherein the mixing includes mixing with a high-shear mixer.

15. The method of claim 8, wherein the polymer includes at least one thiol group.

16. The method of claim 8, further comprising curing the corrosion-inhibiting sol-gel on the metal substrate.

17. The method of claim 8, further comprising applying a secondary layer of organic material to the corrosion-inhibiting sol-gel on the metal substrate.

* * * * *